(12) United States Patent
Tatara et al.

(10) Patent No.: US 8,496,772 B2
(45) Date of Patent: Jul. 30, 2013

(54) TIRE BUILDING METHOD AND BUILDING FACILITY

(75) Inventors: Tetsuo Tatara, Osaka (JP); Tomoyuki Takatsuka, Osaka (JP); Hirokatsu Mizukusa, Osaka (JP); Osamu Fujiki, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 1125 days.

(21) Appl. No.: 11/718,060

(22) PCT Filed: Nov. 2, 2004

(86) PCT No.: PCT/JP2004/016258
§ 371 (c)(1),
(2), (4) Date: Jan. 3, 2008

(87) PCT Pub. No.: WO2006/048924
PCT Pub. Date: May 11, 2006

(65) Prior Publication Data
US 2009/0133808 A1    May 28, 2009

(51) Int. Cl.
*B29D 30/20* (2006.01)
*B29D 30/60* (2006.01)

(52) U.S. Cl.
USPC ............ 156/111; 156/117; 156/396; 156/397

(58) Field of Classification Search
USPC .............. 156/111, 117, 130, 130.7, 396, 397
See application file for complete search history.

(56) References Cited

U.S. PATENT DOCUMENTS

| | | | | |
|---|---|---|---|---|
| 4,473,427 A * | 9/1984 | Irie | | 156/396 |
| 5,746,860 A * | 5/1998 | Moriyama | | 156/111 |
| 5,853,525 A * | 12/1998 | Irie | | 156/396 |
| 2001/0002608 A1* | 6/2001 | Okada et al. | | 156/128.1 |
| 2002/0074077 A1* | 6/2002 | Ikeda et al. | | 156/123 |
| 2002/0153083 A1 | 10/2002 | Takagi | | |
| 2002/0179253 A1* | 12/2002 | Kimura et al. | | 156/397 |

FOREIGN PATENT DOCUMENTS

| | | |
|---|---|---|
| JP | 58-018243 | 2/1983 |
| JP | 61-123528 | 6/1986 |
| JP | 2000-094542 | 4/2000 |
| JP | 2002-178415 | 6/2002 |
| JP | 2002-205512 | 7/2002 |
| JP | 2002-240162 | 8/2002 |
| JP | 2002-307570 | 10/2002 |

* cited by examiner

*Primary Examiner* — Geoffrey L Knable
(74) *Attorney, Agent, or Firm* — Westerman, Hattori, Daniels & Adrian, LLP

(57) ABSTRACT

A tire building method and a tire building facility according to the invention attains reduction of an installation space of the tire building facility and substantially equal building cycles for respective building stages to increase building efficiency and facilitate arrangement switching. For attaining these, a step for building a cylindrical carcass band, a subsequent step for building a cylindrical green case, a step for building a cylindrical belt and tread band, a step for combining the green case and the belt and tread band to build the final shape are divided as first through fourth building stages (S1) through (S4) having individual building drums (D1) through (D4) corresponding to the respective steps. Formations in the respective building stages (S1) through (S4) are simultaneously performed by shifting the carcass band built in the first building stage (S1) to the second building stage (S2), the green case built in the second building stage (S2) to the fourth building stage (S4), and the belt and tread band built in the third building stage (S3) to the fourth building stage (S4).

14 Claims, 9 Drawing Sheets

TIRE BUILDING METHOD AND BUILDING FACILITY

TECHNICAL FIELD

The present invention relates to a method for building a tire having multiple laminated layers of tire components, particularly an unvulcanized green tire, and a building facility of the tire.

BACKGROUND ART

A typical tire has a plurality of rubber components and a plurality of reinforcing components chiefly constituted by cords. As illustrated in FIG. 9, a typical example of the tire includes an inner liner 1, a tread 2, side walls 3, rim strips or chafers 4, under-belt pads 5, and other components, all of which are built by rubber materials having required characteristics. These rubber components are combined with a carcass layer 6 and a belt layer 7 as reinforcing components including cords to become a tire T. FIG. 8 illustrates an example of respective disassembled components of a tire.

FIG. 8 shows the inner liner 1, a tread base 2a and a tread cap 2b constituting the tread 2, the side walls 3, the chafers 4, and the under-belt pads 5 laminated under both side ends of the belt, all of which are built by rubber materials having predetermined characteristics. The carcass layer 6 has first and second carcass plies 6a and 6b, and the belt layer 7 has a plurality of belts 7a and 7b. Each of bead members 8 has a bead core 8a made of wire or the like and a bead filler 8b made of rubber attached to the outer circumference of the bead core 8a. A squeegee 10 as a rubber layer laminated on the inner ply, tapes between plies 6c, belt edge tapes 7c are all made of rubber materials. A spiral tape 9 contains fiber cords.

A double-stage building method is known as a method for building this type of tire. According to this method, the inner liner, the carcass ply and other components are affixed on an expansive and contractive band drum, and the beads and sides are built by a primary building drum to build a green case. The green case is shifted to a secondary building drum which modifies shaping to build the green case into a toroidal shape, onto which the belt, the tread rubber and other components are affixed to build a green tire. In addition, a single-stage building method which uses a single building drum swinging between the position at which both the band building and primary building are executed and the secondary building position is known.

When the tire components in the respective processes are affixed and built at a different building position for each of the primary building step and the secondary building step in the double-stage building method, longer building cycle time is required and therefore improvement of productivity is difficult to achieve.

As a technique for overcoming these drawbacks, a system which uses a plurality of movable building drums to build a green tire has been proposed. In this system, the movable building drums are shifted to predetermined building positions. Predetermined components such as an inner liner or other rubber components or carcass plies are supplied to build a green case in a primary building step, and rubber components such as a belt and a tread are supplied to build a green tire in a secondary building step.

The system which shifts the building drums to execute the double-stage building method requires a complicated and large-scale structure and a large installation and operation space. Moreover, preparatory processes need to be performed for both the rubber components such as the inner liner and the tread and the reinforcing members such as the carcass and the belt before they are supplied for formation. Furthermore, the system requires a wide space for storing various types of plenty of components to facilitate arrangement switching at the time of size change of the tire.

Recently, such a technique has been proposed which builds rubber components having predetermined cross sections by overlapping and spirally winding unvulcanized rubber strips formed by extrusion into ribbon shapes on a building drum (see Patent Reference Nos. 1 through 4 shown below, for example).

According to the technique which builds the rubber components constituting the tire by winding the rubber strips discussed above, the rubber volume considerably differs depending on the types of rubber components. For example, the rubber volume of the components such as the tread and the side walls is relatively large, and the rubber volume of the components such as the under-belt pads and the chafers is relatively small. The rubber components having large rubber volume requires longer time for winding.

In formation of the tire, therefore, the arrangement of the building positions of the respective rubber components is an important factor associated with time required for winding of the respective rubber components. When the building time is not equalized for each of the primary and secondary building steps, loss time is produced in the building cycle.

According to the method disclosed in the Patent Reference No. 1, for example, a breaker corresponding to the belt and the tread are sequentially laminated at a position for building the final shape in the secondary building step. Thus, the side walls are built by winding rubber strips at a position for building the green case in the primary building step. However, since the under-belt pads are also built by winding rubber strips at the position for building the green case, the building cycle in the primary building step takes longer time as the rubber volume of the side walls increases. In this case, there is a possibility that prolongation of the entire building cycle time occurs.

Patent Reference No. 1: JP-B-6-51367
Patent Reference No. 2: JP-A-9-29858
Patent Reference No. 3: JP-A-2002-178415
Patent Reference No. 4: JP-A-2002-205512

DISCLOSURE OF THE INVENTION

Problems that the Invention is to Solve

It is an object of the invention to provide a tire building method and a tire building facility capable of reducing installation space of the entire facility required for building a tire, equalizing respective building cycles in respective building stages to increase efficiency of tire formation, and facilitating arrangement switching.

Means for Solving the Problems

A tire building method according to the invention is a method for obtaining an unvulcanized green tire by laminating a carcass ply on a rubber layer containing an inner liner to build a cylindrical carcass band, setting a bead on the carcass band and turning up the carcass band to build a cylindrical green case, and assembling and combining a cylindrical belt and tread band on which a belt, a tread and the like are laminated on the outer circumference of the green case to build a final shape. The tire building method is characterized in that a step for building the cylindrical carcass band, a subsequent step for building the cylindrical green case, a step for building the cylindrical belt and tread band, a step for combining the green case and the belt and tread band to build the final shape are divided as first through fourth building stages having individual building drums corresponding to the respective steps. The tire building method is also characterized in that formations in the respective stages are simultaneously performed by shifting the carcass band built in the first building stage to the second building stage, the green case built in the second building stage to the fourth building stage, and the belt and tread band built in the third building stage to the fourth building stage to combine the belt and tread band with the green case.

According to the invention, as described above, the tire building process is divided into the first through fourth building stages having building drums corresponding to the respective formations, and building processes in the respective building steps are simultaneously performed in the corresponding building stages. Thus, the building cycle time different according to the types of rubber components can be distributed among the respective building stages. Accordingly, the building cycle time becomes substantially equal in each of the building stages.

Particularly, in building the tread, the tread and the belt layer are initially built into the cylindrical belt and tread band in the third building stage, thereafter the belt and tread band is combined with the green case into one body in the fourth building stage. Thus, the side wall can be built into the final shape without causing problem in the fourth building stage, leading to the condition that the building cycle time becomes substantially equal in each of the building stages. Accordingly, time loss in the building cycle decreases, and thus tire building efficiency improves.

According to the structure in which rubber components such as the inner liner, a chafer, and a squeegee included in the carcass band, and a rubber layer between belt layers and a tread rubber included in the belt and tread band are built by winding band-shaped rubber strips extruded from respective extruders, only elongate rubber materials receivable by the extruders need to be supplied for building the rubber components. Thus, the preparatory step can be simplified, and arrangement switching at the time of size change of the tire can be easily executed.

In the second building stage, under-belt pads laminated under both side ends of the belt layer can be built by winding the rubber strip extruded from the extruder on the carcass outer circumference of the green case. Thus, the under-belt pads having arbitrary cross sections can be built, and the size of the tire to be built can be easily changed.

In the fourth building stage, at least a part of the side wall can be built by winding the rubber strip extruded from the extruder. Since the side wall is built into a shape similar to the final shape, variations in the thicknesses and weights of the rubber components caused by expansion after shaping are reduced. Moreover, time required for the primary building step for building the green case is not prolonged.

A separate building stage for affixing the side wall, in which stage the green case is supported by another building drum, may be provided in an area following the second building stage. In the separate building stage, a part of the side wall may be built by winding the rubber strip extruded from the extruder with the green case supported by the building drum.

In this case, the winding process of the rubber strip is divided between two building stages when the rubber volume of the side wall is large. Thus, the building cycle time is not partially prolonged, and the time required for the building cycle becomes approximately equal in each building stage. Accordingly, tire building efficiency can be increased.

A separate building stage for affixing the side wall, in which stage the green case is supported by another building drum, may be provided in an area following the second building stage. In the separate building stage, a part of the side wall may be built by affixing band-plate-shaped rubber material with the green case supported by the building drum. Similarly to the above case, the formation of the side wall is divided between two building stages, and the time required for the building cycle becomes approximately equal in each building stage. Moreover, when a white sidewall line is desired to be built on the tire side, it is possible to use a band-plate-shaped rubber material including a white rubber and build the tire having the white line without any trouble.

A tire building facility according to another aspect of the invention is a facility for building a green tire by the above tire building method. The tire building facility is characterized in that a step for building the cylindrical carcass band, a subsequent step for building the cylindrical green case, a step for building the cylindrical belt and tread band, a step for combining the green case and the belt and tread band to build the final shape are divided as first through fourth building stages having individual building drums corresponding to the respective steps. The tire building facility is also characterized in that the tire building facility includes first shifting means that shifts the carcass band built in the first building stage to the second building stage, second shifting means that shifts the green case built in the second building stage to the fourth building stage, and third shifting means that shifts the belt and tread band built in the third building stage to the fourth building stage. In the tire building facility, formations in the respective building stages are simultaneously performed. Since formations in the respective building stages are simultaneously performed according to the building facility, the above building method can be executed without causing problem.

According to the invention, a building drum in the first building stage, a building drum in the second building stage, a building drum in the third building stage, and a building drum in the fourth building stage are disposed in such conditions as to be movable in axial directions in the respective building stages with axial centers of the respective drums extending in parallel. In this case, transfer of the carcass band, green case, belt and tread band and others from the first, second or third building stage to the second or fourth building stage requires no change of direction, and therefore transfer means for the transfer can be simplified. Moreover, attachment and detachment of the transfer means to and from the building drums can be facilitated.

Extruders that extrude band-shaped rubber strips building rubber components such as an inner liner, a chafer, and a squeegee included in the carcass band, and a rubber layer between belt layers and a tread rubber included in the belt and tread band can be disposed at building positions determined for each of the rubber components in the first through third building stages. Thus, the preparatory steps for the respective rubber components can be simplified, and arrangement switching can be easily performed.

In the second building stage, the extruder that extrudes the rubber strip building under-belt pads laminated under both side ends of the belt layer wound on the carcass outer circumference of the green case may be provided at a predetermined building position. Thus, the under-belt pads having arbitrary cross sections can be built.

In the fourth building stage of the above building facility, it is particularly preferable that the extruder that extrudes the rubber strip building at least a part of a side wall is provided at a predetermine building position. In this case, the building time required for the step in the primary formation for building the green case is not prolonged.

In the above building facility, a separate building stage for affixing the side wall, in which stage the green case is supported by another building drum, may be provided in an area following the second building stage, and an extruder that extrudes a rubber strip building a part of the side wall may be equipped in the separate building stage. In this case, the winding process of the rubber strip is divided between two building stages when the rubber volume of the side wall is large. Thus, the time required for the building cycle becomes approximately equal in each building stage.

Additionally, a separate building stage for affixing the side wall, in which stage the green case is supported by another building drum, may be provided in an area following the second building stage, and a servicer that supplies and affixes band-plate-shaped rubber material building a part of the side wall may be equipped in the separate building stage. Similarly to the above case, the time required for the building cycle becomes approximately equal in each building stage. Moreover, a tire having a white sidewall line can be easily built by using a band-plate-shaped rubber component containing a white rubber.

Advantage of the Invention

As obvious from above description, according to the tire building method and building facility of the invention, the units corresponding to a series of the steps are disposed without excessively increasing the space of the overall tire building process. Moreover, the steps for building the carcass band, building the green case by executing bead setting and turning up for the carcass band, building the belt and tread band, and combining the green case and the belt and tread band into the final shape are distributed among at least four building stages, and formations in the respective stages are simultaneously performed. In this case, the building cycle time required for winding the rubber strips to build the respective rubber components constituting the tire components constituting the tire can be distributed among the respective building stages, and thus the building cycle time becomes equal in each of the building stages. Accordingly, the entire building efficiency improves.

BEST MODE FOR CARRYING OUT THE INVENTION

Embodiments according to the invention are hereinafter described with reference to the drawings.

A tire T to be built according to the invention is an unvulcanized green tire an example of which is shown in FIG. 9. The tire T has specific components shown in FIG. 8 as disassembled parts. These components are not specifically explained herein. In the components, the first and second carcass plies 6a and 6b constituting the carcass layer 6 and the plural belts 7a and 7b constituting the belt layer 7 have reinforcing cords as core materials and rubber materials covering the reinforcing cords. Components except for the carcass plies 6a and 6b, the belts 7a and 7b, the bead cores 8a of the bead members 8, that is, the inner liner 1, the tread 2, the side walls 3, the chafers 4, the under-belt pads 5, and other members are made of rubber materials.

The side walls are built by winding only rubber strips as the side walls 3 illustrated in FIG. 8 by solid lines, or by combining band-plate-shaped rubber components 3a and rubber strips 3b surrounded by chain lines in the figure. According to a first embodiment shown in FIGS. 1 and 2, the side walls 3 are built by winding rubber strips after shaping as will be described later.

First Embodiment

FIG. 1 schematically illustrates an entire structure of a building facility used in the first embodiment. FIG. 2 is a block diagram showing building steps performed by using the building facility shown in FIG. 1.

The invention pertains to a method for building the above-described tire before vulcanization in its manufacturing process. According to the basic technique of the building method, the carcass plies 6a and 6b are laminated on a rubber layer containing the inner liner 1 to build a cylindrical carcass band. Then, processes such as bead setting and turn-up are executed for the carcass band to build a cylindrical green case. Subsequently, a cylindrical belt and tread band on which the belt layer, tread rubber and other components are laminated are attached to the outer circumference of the green case as one body to build the final shape of the unvulcanized green tire.

Particularly, as obvious from FIG. 1 schematically illustrating the building facility, the building method according to the invention divides the building processes into a band building step for building the cylindrical carcass band 1, a subsequent green case building step for assembling and building the cylindrical green case before shaping by executing bead setting, turn-up and other processing to the carcass band, a belt building step for building the cylindrical belt and tread band, a final shape building step for combining the belt and tread band and the green case into the final shape as first through fourth stages S1 through S4 having individual building drums D1 through D4 associated with the respective building steps.

The respective formations in the building stages S1 through S4 are simultaneously performed by shifting the carcass band built in the first building stage S1 to the second building stage S2, shifting the green case built in the second building stage S2 to the fourth building stage S4, and shifting the belt and tread band built in the third building stage S3 to the fourth building stage S4 to combine the belt and tread band with the green case.

Thus, the respective first through fourth building stages S1 through S4 have individual units used to execute the corresponding steps so that predetermined functions can be performed.

The units, functions and operations in the first through fourth building stages S1 through S4 performed in the building facility according to the building method of the first embodiment are now described with reference to FIG. 1.

The first building stage S1 as the band building step has the expandable and contractive first building drums D1. The first building drums D1 have circumferential faces wider than the carcass layer and are rotatably supported by supporting stands 10 mounted on trucks. The first building stage S1 further includes a first movement section 11 for moving the building drums D1 to building positions of the inner liner, chafer, and squeegee (1, 4 and 1c in FIG. 8), and a second movement section 12 for moving the building drums D1 to building positions of the first and second carcass plies 6a and 6b. The first movement section 11 and the second movement section 12 provide tracks along which the trucks carrying the supporting stands 10 move.

The building drums D1 are supported by the supporting stands 10 such that the axial centers of the building drums D1 are disposed in parallel with the moving directions of the movement sections 11 and 12, and the building drums D1 are movable maintaining this supporting condition. The first movement section 11 and the second movement section 12 are disposed in parallel with each other. A turning member (turn table) 13 for turning the directions of the building drums D1 and the supporting stands 10 through 180 degrees is provided between the movement sections 11 and 12. Generally, two building drums D1, D1 are supported by the corresponding supporting stands 10, 10 as illustrated in the figure. The first movement section 11 and the second movement section 12 are alternately shifted to sequentially perform predetermined building processes as will be described later.

The respective building positions of the inner liner, chafer and squeegee as rubber components are established along the first movement section 11, and respective extruders E1, E2 and E3 for extruding rubber strips building the respective components are equipped. When the building drum D1 reaches the respective building positions, the rubber strips are extruded and supplied for the building drum D1. Then, the rubber strips are wound by the drum rotation while the building drum D1 and the extruders E1, E2 and E3 are shifted relative to each other in the axial direction so as to build the respective components having predetermined thicknesses and widths.

A first carcass ply servicer 15a and a second carcass ply servicer 15b are disposed in parallel along the second movement section 12. When the building drum D1 reaches the respective building positions corresponding to the servicers 15a and 15b from the first movement section 11 through the turning member 13, the first and second carcass ply servicers 15a and 15b feed the first carcass ply 6a and second carcass ply 6b to the building drum D1 and affix the first and second carcass plies 6a and 6b onto the inner liner 1 in lamination by the drum rotation to build the cylindrical carcass band.

The first and second servicers 15a and 15b have alignment conveyers 16a and 16b extending in the direction perpendicular to the second movement section 12, and cutting units 17a and 17b for cutting elongate band-shaped sheets constituting carcass plies supplied in the direction perpendicular to the alignment conveyers 16a and 16b, that is, band-shaped sheets having a predetermined width and a number of fiber cords (ply cords) arranged in parallel and covered by rubber layers, into strips having a fixed length. The first and second servicers 15a and 15b further have placing units 18a and 18b for shifting and placing the cut ply strips on the alignment conveyers 16a and 16b in alignment. Thus, the cut ply strips are aligned and connected on the conveyers 16a and 16b to build the carcass plies 6a and 6b having the predetermined widths and lengths. The servicers 15a and 15b also have feeding means 19a and 19b for holding the distal ends of the carcass plies 6a and 6b thus built and feeding the carcass plies 6a and 6b onto the building drum D1 such that the affixing process discussed above can be initiated.

An extruder E4 for extruding rubber strips constituting the tape between plies (6c in FIG. 8) disposed between respective carcass plies is provided at a position opposed to a substantially center position of the first and second servicers 15a and 15b with the second movement section 12 interposed between the extruder E4 and the first and second servicers 15a and 15b. The tape between plies is built after the first carcass ply 6a is affixed, and then the second carcass ply is affixed. When the carcass layer has three layers, the tape between plies is similarly built after the second carcass ply 6b is affixed, and then the third carcass ply is affixed by the first servicer 15a.

An annular stitcher 20 for pressing the affixed and laminated carcass plies and discharging air therefrom is provided on the second movement section 12 in parallel with the building positions of the carcass plies 6a and 6b. The stitcher 20 has a number of pressing rollers (not shown) on two rows of the inner circumference of its annular frame in the circumferential direction. The stitcher 20 presses the entire circumferences of the carcass plies while the carcass plies on the building drum D1 are passing through the inner circumference of the stitcher 20.

Then, the cylindrical carcass band built in the first building stage S1 is held from its outer circumference by a transfer 21 of band transfer means C1 and extracted from the building drum D1, therefrom the cylindrical carcass band is shifted to the following second building stage S2.

The second building stage S2 has the expandable and contractive second building drum D2 for holding the carcass band shifted from the first building stage S1, i.e., the band building step. The second building stage S2 further has a pair of support members 23 and 24 for supporting the building drum D2 such that the building drum D2 is rotatable. The support members 23 and 24 disposed on a movement section 22 extending in the direction perpendicular to a movement section of the band transfer means C1 are opposed to each other with the band transfer means C1 interposed between the support members 23 and 24. Each of the support members 23 and 24 is movable on the movement section 22. The building drum D2 is mounted on a support shaft 25 extending from the support member 23 in such a manner as to be cantilevered by the shaft 25. A support shaft 26 provided on the other support member 24 can be brought into engagement with the distal end of the support shaft 25.

After the building drum D2 (cantilevered) having a contracted diameter is inserted into the cylindrical carcass band shifted by the band transfer means C1 in accordance with the movement of the support member 23, the building drum D2 expands its diameter and thus engages with the cylindrical carcass band to hold the carcass band on the outer circumference of the building drum D2. After the transfer 21 of the band transfer means C1 is separated, the support shaft 26 of the support member 24 engages with the support shaft 25 by the movement of the support member 24. Thus, the building drum D2 having the carcass band is supported on both sides.

Turn-up means (not shown) such as an air bladder and setting means (not shown) for setting the annular bead member (8 in FIG. 8) having the bead core (8a in FIG. 8) and the bead filler (8b in FIG. 8) are provided on the outer circumferences of the support members 23 and 24 axially on the outer sides of both the ends of the second building drum D2 supported in the above manner. Bead automatic supply means 29 for automatically supplying the bead member to the setting means is equipped in the vicinity of the position where the carcass band is received and held. The bead member is supplied to and held at the position of the setting means by the time when the carcass band is received by the building drum D2. After the carcass band is held on the building drum D2, the bead member is set at each of predetermined positions on both sides of the carcass band by the setting means. Subsequently, both the side ends of the carcass band (both side ends of carcass ply) are folded outward in such a manner as to cover the bead members by the bladder of the turn-up means. A bead stitcher 28 shown in the figure stitches the bead filler portion from above the folded portion after the turn-up.

An extruder E5 for extruding rubber strips building the under-belt pads (5 in FIG. 8) is disposed along the movement section 22 of the support members 23 and 24 supporting the building drum D2.

In the second building stage S2, the building drum D2 is shifted to the position corresponding to the extruder E5 which extrudes rubber strips constituting the under-belt pads with the carcass band held and turned up by the building drum D2.

Then, the rubber strip is extruded and supplied to the building drum D2 by the extruder E5 with the building drum D2 rotating, and the rubber strip is wound on a predetermined position of the carcass surface to build the under-belt pad having a triangular cross section, for example. The width of the under-belt pad can be determined by shifting the building drum D2 and the extruder E5 relative to each other in the axial direction. The shape of the cross section of the under-belt pad can be varied by controlling the winding condition.

The cylindrical green case thus built is held from its outer circumference by a transfer 27 of second case transfer means C2 extending in the direction perpendicular to the movement section 22 of the support members 23 and 24. Simultaneously, the diameter of the second building drum D2 contracts, and thus the connection with the support shafts 25 and 26 of the support members 23 and 24 is separated. Thus, the building drum D2 is separated from the cylindrical green case by the movement of the support member 23.

The cylindrical green case held by the transfer 27 of the second case transfer means C2 is shifted to the fourth building stage S4 as the building step for assembly and formation into the final shape, and held by the bead lock drum D4 as the fourth building drum which will be described later. A case storage 49 in the figure stores the green cases.

In the third building stage S3 as the belt building step, the belt drums D3 as the expandable and contractive third building drums are rotatably supported by a support stand 30. The third building stage S3 further has a first movement section 31 for shifting the belt drum D3 to the building position at which the belts 7a and 7b are affixed, and a second movement section 32 for shifting the belt drum D3 to the tread building position. The belt drums D3 are supported by the support stand 30 such that the axial centers of the belt drums D3 are directed in parallel with the moving directions of the respective movement sections. The first movement section 31 and the second movement section 32 are disposed in parallel with each other. A turning member (turn table) 33 for turning the directions of the belt drums D3 and the supporting stands 30 through 180 degrees is provided between the movable members 31 and 32.

A first belt building unit 35a and a second belt building unit 35b are disposed in parallel along the first movement section 31. When the belt drum D3 reaches the building positions corresponding to the respective belt building units 35a and 35b, the first and second belt building units 35a and 35b feed the first and second belts 7a and 7b to the belt drum D3 and affix the first and second belts 7a and 7b onto the belt drum D3 by the drum rotation.

The first and second belt building units 35a and 35b have alignment conveyers 36a and 36b extending in the directions perpendicular to the first movement section 31, and cutting units 37a and 37b for diagonally cutting band-shaped materials for belts supplied in the directions parallel with the alignment conveyers 36a and 36b, that is, band-shaped materials for belts having predetermined widths and embedded belt cords (metal cords) in parallel into the rubber layers, into belt strips having predetermined lengths and predetermined angles while the belt-shaped materials are continuously supplied. The first and second belt building units 35a and 35b further have placing units 38a and 38b for holding the cut belt strips by attracting means such as a magnet and shifting and placing the belt strips on the alignment conveyers 36a and 36b in alignment while the belt strips are being rotated such that the sloping cut end sides of the belt strips extend in the longitudinal direction of the alignment conveyers 36a and 36b. Thus, the diagonally cut belt strips are placed on the alignment conveyers 36a and 36b and connected such that the sloping end sides are aligned to build the belts 7a and 7b which have the predetermined widths and lengths and contain the cords extending diagonally. The first and second belt building units 35a and 35b also have feeding means 34a and 34b for holding the ends of the built belts 7a and 7b and feeding the belts 7a and 7b onto the belt drum D3, and affixing process is initiated by using the feeding means 34a and 34b.

The cutting direction and alignment direction of the band-shaped materials are determined such that the cord directions of the belts 7a and 7b produced by the first and second belt building units 35a and 35b are oppositely inclined to the left and right. For example, when the cord of the belt 7a produced by the first belt building unit 35a is inclined upward toward the left, the cord of the belt 7b produced by the second belt building unit 35b is inclined upward toward the right.

An extruder E9 for extruding rubber strips constituting belt edge tapes (7c in FIG. 8) for protection of the belt edges, and supply means 39 for supplying the spiral tapes (9 in FIG. 8) containing fiber cords to be wound on the belt are provided in parallel in the moving direction at a position opposed to the first and second belt building units 35a and 35b with the first movement section 31 interposed between the components of the first and second belt building units 35a and 35b and the components of the extruder E9 and the supply means 39. After the first belt is affixed onto the belt drum D3, the belt drum D3 is shifted to the position corresponding to the extruder E9. Then, the rubber strips constituting the belt edge tapes are extruded on both the side ends of the first belt 7a and wound thereon by the drum rotation. Subsequently, the second belt 7b is affixed, and the spiral tape is spirally wound and affixed onto the second belt 7b.

An extruder E10 for extruding rubber strips constituting the tread base (2a in FIG. 8) and an extruder E11 for extruding rubber strips constituting the tread cap (2b in FIG. 8) are disposed in parallel along the second movement section 32. When the belt drum D3 is shifted to the building positions corresponding to the extruders E10 and E11 from the first movement section 31 via the turning member 33, the rubber strip for the tread base and the rubber strip for the tread cap are extruded for the belt drum D3. Then, the belt drum D3 is rotated with the belt drum D3 and the extruders E10 and E11 shifted relative to each other to wind the rubber strips on the spiral tape of the belt layer. Thereafter, the respective layers of the tread base and the tread cap having predetermined thicknesses and widths in accordance with the shape of the tread are laminated to build the cylindrical belt and tread band.

The belt and tread band thus built is inserted into an annular transfer 60 as third transfer means movable on a movement section 42 of the fourth building stage S4 by the relative movements of the transfer 60 and the belt drum D3. The movement section 42 follows the second movement section 32 and will be described later. The belt and tread band is held from its outer circumference by the transfer 60, and is separated from the belt drum D3 and shifted to the fourth building stage S4 for assembly and formation into the final shape.

The fourth building stage S4 has the bead lock drum D4 as the fourth building drum for holding the green case shifted by the second case transfer means C2 and shaping and building the green case into the final shape. The bead lock drum D4 holds the beads at both the side ends of the green case and has two drums d1 and d2 functioning as former rings. Both the drums d1 and d2 are rotatably cantilevered by a supporting shaft 41 of a support member 40 movable on the movement section 42 crossing the case transfer means C2 at right angles. The drums d1 and d2 apply internal pressure to the green case held by the bead lock drum D4 by charging the green case with compressed air. The movement section 42 is disposed on the extension line of the second movement section 32 of the third building stage S3 in the same direction.

In the fourth building stage S4, the belt and tread band held by the transfer 60 and the green case held by the bead lock drum D4 are combined.

More specifically, the belt and tread band engages with the outer circumference of the green case held by the bead lock drum D4 by the relative movements of the transfer 60 and the bead lock drum D4 (cantilevered) supported by the support member 40 (the bead lock drum D4 passes through the position of an extracting unit to be described later). At the time of the engagement, internal pressure is applied to the bead lock drum D4 to expand the green case to some extent. Under this engagement condition, the transfer 60 is separated. Then, the green case and the belt and tread band are held by the bead lock drum D4 and shifted to a predetermined building position (building position of the side walls to be described later). At the building position, both the drums d1 and d2 of the bead lock drum D4 holding the beads of the green case are displaced in the directions approaching each other to function as former rings. Simultaneously, the drums d1 and d2 apply internal pressure by charging the green case with compressed air or by using a mechanical expansion device (not shown) to build the green case into the final shape.

Thus, the outer circumferential surface of the shaped green case contacts the inner circumferential surface of the belt and tread band held by the transfer 60 with pressure, and the green case and the belt and tread band are joined. Subsequently, the tread is stitched from its outer circumference by a stitcher 62 so as to bond the green case and the belt and tread band as one assembled body.

The fourth building stage S4 has extruders E12, E12 for extruding rubber strips constituting the side walls (3 in FIG. 8) for both sides of the assembled body at a position offset in the moving direction from the assembly position, for example. The rubber strips constituting the side walls are extruded and supplied for both the sides of the assembly body by the extruders E12, E12, and the side walls are affixed and laminated by the drum rotation. After affixation, the outer circumferential surface is pressed by the stitchers (not shown) included in the extruders E12, E12 to build the predetermined shape, thereby completing formation of the green tire shown in FIG. 9.

Subsequently, the green tire is shifted to the extracting position while supported by the bead lock drum D4, and application of internal pressure and bead lock are released (expansion is released when mechanical expanding device is used). Then, the green tire is held from its outer circumference by an extracting unit 65 and extracted from the fourth building stage S4 to a carrying stand 66. Conveying means 67 conveys the green tire.

According to the building method of the invention, the processes for building a tire are divided into the first through fourth building stages S1 through S4 having the building drums D1 through D4 corresponding to the respective building steps, and the respective processes are simultaneously performed in the building stages S1 through S4. FIG. 2 is a block diagram showing the building steps corresponding to the building stages. Particularly, according to the first embodiment, the tread and the belt layer as the belt and tread band are built into a cylindrical shape, and the belt and tread band having this shape is combined with the green case in the fourth building stage. In addition, the side walls are built in the fourth building stage for building the final shape. Thus, the time required for the building cycle becomes approximately equal for each building stage by distributing the building cycle time different according to the types of rubber components among the respective building stages. Accordingly, the time loss in the building cycle decreases, and the tire building efficiency improves.

Second Embodiment

FIG. 3 schematically illustrates the entire structure of a building facility used in a second embodiment according to the invention. FIG. 4 is a block diagram showing steps of a building method in the second embodiment using the building facility shown in FIG. 3.

Similarly to the building facility in the first embodiment, as shown in FIG. 3, the building facility in the second embodiment has the first building stage S1 as the band building step for building the cylindrical carcass band 1, the subsequent second building stage S2 as the step for assembling and building the cylindrical green case prior to shaping by applying processes such as bead setting and turn-up to the carcass band, the third building stage S3 as the belt building step for building the cylindrical belt and tread band, and the fourth building stage S4 as the step for combining the belt and tread band and the green case to build the final shape. The building stages S1 through S4 have the individual building drums D1 through D4 corresponding to the respective building steps. Similarly to the above case, the formations in the respective stages S1 through S4 are simultaneously performed.

The second embodiment is different from the first embodiment in that the second building stage S2 has a bead filler (bead pad) winding function, and that a separate building stage S5 for separately affixing side walls is provided in the area following the second building stage S2. Those differences are now explained with reference to FIG. 3. Similar reference numbers are given to devices and components similar to those in the first embodiment, and explanations of their structures and building conditions are not repeated herein.

As illustrated in FIG. 3, the second building stage S2 has an extruder E6 for extruding rubber strips constituting the bead fillers (bead pads) in parallel with the extruder E5 for extruding rubber strips constituting the under-belt pads.

In the second building stage S2, the rubber strip extruded from the extruder E5 is wound on the carcass band held on the building drum D2 to build the under-belt pad. Then, the building drum D2 is shifted to the position corresponding to the extruder E6 for extruding the rubber strips constituting the bead filler, where the rubber strip extruded from the extruder E6 is wound on the bead portion by the drum rotation to build the bead filler. In the second embodiment, therefore, the bead member supplied from the bead automatic supply means 29 is constituted by parts of the bead core and bead filler, and the rubber strip extruded from the extruder E6 is added to the bead member and wound thereon as the additional part of the bead filler. After winding the bead filler, both the side ends of the carcass band are folded outward by the bladder of the turn-up means in such a manner as to cover the entire part of the bead filler similarly to the case of the first embodiment. Then, the folded carcass band is stitched by the stitcher 28.

Subsequently, the cylindrical green case thus built is held from its outer circumference by the transfer 27 of the second case transfer means C2. Subsequent to the second building stage S2, the green case is transferred to the separate building stage S5 for separately affixing the side walls, which stage S5 is provided in the direction opposite to the shift direction of the case transfer means C2 to the fourth building stage S4.

More specifically, the cylindrical green case held by the transfer 27 of the case transfer means C2 is carried on a receiver stand 53 of the separate building stage S5 for building parts (approximately half) of the side walls. The receiver stand 53 rotates the cylindrical green case through 90 degrees while carrying the green case. Thus, the opening of the green case faces in the same direction as the transfer direction.

The separate building stage S5 has a supporting member 55 for supporting an expandable and contractive fifth building drum D5 such that the building drum 5 can rotate. The support member 55 is movable on a movement section 54 extending in the same direction as the moving direction of the case transfer means C2. When the opening of the cylindrical green case supported by the receiver stand 53 faces in the moving direction of the movement section 54, the building drum D5 having a contracted diameter is inserted into the green case by the movement of the support member 55. Then, the building drum D5 under this condition expands its diameter so as to hold the green case by the engagement therewith.

After the engagement, the building drum D5 is shifted to the building position of the side walls, and the rubber strips constituting the side walls are extruded and supplied from an extruder E7 provided at a position corresponding to the side wall building position. Then, the rubber strips are wound and laminated at predetermined positions of both the side ends (on the carcass plies after turn-up) of the cylindrical green case by the drum rotation to build parts (half, for example) of the side walls having predetermined width and thickness.

The cylindrical green case thus built is returned onto the receiver stand 53 by the shift of the support member 55. After the building drum D5 is separated, and the receiver stand 53 is rotated toward the original direction. Then, the green case is again held from its outer circumference by the transfer 27 of the case transfer means C2 and shifted to the fourth building stage S4, where the green case is held by the bead lock drum D4 similarly to the case of the first embodiment.

In the fourth building stage S4, similarly to the case of the first embodiment, the green case and the cylindrical belt and tread band built in the third building stage S3 and shifted therefrom are combined. Then, rubber strips are extruded and supplied from the extruders E12, E12 which extrude rubber strips constituting the side walls, and the remaining parts (approximately half) of the side walls are affixed and laminated to complete the green tire having the predetermined shape.

According to the building method of the second embodiment, the tire building processes are divided into the first through fourth building stages S1 through S4 having the building drums D1 through D4 corresponding to the respective building steps. In addition, the building method of the second embodiment has the separate side wall building stage S5 having the fifth building drum D5. These building steps in the building stages S1 through S4 and S5 are simultaneously performed as shown in the block diagram in FIG. 4.

Similarly to the above case, the building cycle time different according to the types of rubber components can be distributed among the respective building stages. Particularly, when the rubber volume of the side walls is large, the building cycle time is not partially prolonged since the winding process of the rubber strips is divided into two building stages. As a result, the time required for the building cycle becomes approximately equal in each building stage, and therefore the tire building efficiency improves.

Third Embodiment

FIG. 5 schematically illustrates the entire structure of a building facility used in a third embodiment according to the invention. FIG. 6 is a block diagram showing steps of a building method in the third embodiment using the building facility shown in FIG. 5.

In the building facility of the third embodiment, as shown in FIG. 5, similarly to the building facility in the second embodiment, the second building stage S1 included in the structure in the first embodiment has the winding function (extruder E6) of the bead fillers (bead pads), and the separate side wall building stage S5 having the fifth building drum D5 is provided in the area following the second building stage S2. Other devices and structures of the respective building stages are similar to those in the second embodiment. Similar reference numbers are given to similar parts and building conditions, and explanation of those are not repeated herein.

The third embodiment is different from the second embodiment in that the separate side wall building stage S5 has a servicer 58 for supplying band-plate-shaped side wall materials built to have predetermined cross-sectional shapes in advance (corresponding to approximately half of side walls, 3b in FIG. 8) instead of the extruder E7. The servicer 58 supplies the band-plate-shaped side wall materials on predetermined positions of both side ends of the cylindrical green case (on the carcass plies after turn-up) held by the fifth building drum D5, and affixes the side wall materials to the predetermined positions.

Thus, the structure of the third embodiment is appropriate for formation of a white side wall. When a white side wall is desired to be built on one of both sides of the tire, a band-plate-shaped side wall material formed to have a predetermined cross section containing a white rubber is used and affixed to one of the side wall portions. A black band-plate-shaped side wall material is affixed to the other side wall portion.

An extruder (not shown) for extruding strips constituting cover rubbers may be added as necessary so as to affix cover rubbers on the side wall materials.

The cylindrical green case thus built is shifted to the fourth building stage S4 by the case transfer means C2 similarly to the above case, and held by the bead lock drum D4. In the building stage S4, the green case is combined with the cylindrical belt and tread band built in the third building stage S3. Then, the rubber strips extruded from the extruders E12, E12 are wound and laminated so that the remaining parts (approximately half) of the side walls can be affixed, and the green tire is thus completed.

The steps of the building method according to the third embodiment are shown in the block diagram of FIG. 4. Similarly to the above case, when the rubber volume of the side walls is large, the winding process of the rubber strips is divided into two building stages in the third embodiment. In addition, the building cycle time different according to the types of rubber components can be distributed among the respective building stages. As a result, the time required for the building cycle becomes approximately equal in each building stage. Moreover, a tire having a white line can be easily built by using band-plate-shaped rubber materials containing white rubbers.

Fourth Embodiment

FIG. 7 illustrates a structure of a fourth embodiment using a tire building facility of a different type from the tire building facilities used in the first through third embodiments. Similar reference numbers are given to devices and components having substantially the same functions as those in the first through third embodiments.

Similarly to the building facilities in the first through third embodiments, the building facility in the fourth embodiment has the first building stage S1 as the band building step for building the cylindrical carcass band 1, the subsequent second building stage S2 as the step for assembling and building the cylindrical green case prior to shaping by applying processes such as bead setting and turn-up to the carcass band, the third building stage S3 as the belt building step for building the cylindrical belt and tread band, and the fourth building stage S4 as the step for combining the belt and tread band and the green case to build the final shape. The building stages S1 through S4 have the individual building drums D1 through D4 corresponding to the respective building steps. Similarly to the above case, the formations in the respective stages S1 through S4 are simultaneously performed.

The first building stage S1 has the expandable and contractive first building drums D1 (two drums in an ordinary case). The first building drums D1 are rotatably supported by the support stand 10 on the truck in such a manner as to be movable on a movement section 71 extending in the left-and-right direction in the figure. The first building stage S1 also has an escape area 71a located on the side of the movement section 71, to which area 71a one of the building drums D1 escapes from the movement section 71 when the positions of the two building drums D1 are switched.

The extruders E1, E2 and E3 for extruding rubber strips constituting the components of the inner liner, chafer, and squeegee are disposed along one end of the movement section 71. When the building drum D1 reaches the respective building positions corresponding to the extruders E1, E2 and E3, the rubber strips are extruded and supplied for the building drum D1 to build the respective components having the predetermined thicknesses and widths by winding the rubber strips in accordance with the drum rotation while the building drum D1 and the extruders E1, E2 and E3 are shifted relative to each other in the axial direction.

A first carcass ply servicer 85a and a second carcass ply servicer 85b are disposed in parallel along the other end of the movement section 71. The stitcher 20 is interposed between the servicers 85a and 85b. In the fourth embodiment, the first building stage S1 has the extruder E5 for extruding rubber strips constituting under-belt pads.

After the inner liner, chafers, and squeegee are wound on the first building drum D1, the first building drum D1 is shifted to the respective positions of the other ends of the movement section 71 corresponding to the servicers 85a and 85b. Initially, the first carcass ply 6a is affixed to and laminated on the inner liner at the position of the building drum D1 corresponding to the first servicer 85a by the drum rotation. Then, the second carcass ply 6b is affixed and laminated at the position corresponding to the second servicer 85b. Subsequently, the stitcher 20 stitches the first and second carcass plies 6a and 6b to build a cylindrical carcass band.

The carcass plies are building by cutting an elongate band-shaped sheet constituted by a number of fiber cords (ply cords) arranged in parallel and a rubber layer covering the fiber cords into pieces having predetermined widths, and then connecting the cut pieces of the sheet with the cords extending in the transverse direction and winding the connected pieces into a roll shape in the preparatory step before the building facility. The first and second servicers 85a and 85b sequentially supply and affix the carcass plies thus built onto the building drum D1. A tape between plies as a rubber layer provided between the plies is overlapped with at least one of the first ply and the second ply (first ply, for example) in the preparatory step in advance, and the tape between plies is affixed and laminated with the plies. Thus, the extruder for winding the tape between plies is not present in the fourth embodiment.

The cylindrical carcass band is shifted to the position corresponding to the extruder E5 for building under-belt pads, where rubber strips extruded and supplied from the extruder E5 are wound on predetermined positions of the carcass surface by the rotation of the building drum D1 to build under-belt pads.

After the under-belt pads are built in the first building stage S1, the cylindrical carcass band is held from its outer circumference by the transfer 21 of the first band transfer means C1 extending in the direction perpendicular to the movement section 71. After the building drum D1 is separated from the carcass band, and the carcass band is shifted to the second building stage S2.

The second building stage S2 has the expandable and contractive second building drum D2 for holding the carcass band transferred from the first building stage S1. The building drum D2 has a pair of drums D2-1 and D2-2 supported by a pair of support members 23 and 24 movable on the movement section 22 extending in the direction perpendicular to the band transfer means C1. The drums D2-1 and D2-2 having contracted diameters are inserted from both sides into the carcass band shifted by the band transfer means C1. Then, the drums D2-1 and D2-2 expand their diameters and engage with the carcass band such that the carcass band can be held on the outer circumferences of the drums D2-1 and D2-2, that is, the outer circumference of the building drum D2. Simultaneously, the transfer 21 is separated from the carcass band.

The turn-up means such as an air bladder and the setting means for setting the annular bead member constituted by parts of the bead core and the bead filler are provided on the outer circumferences of the support members 23 and 24 axially on the outer sides of both the ends of the building drum D2 supported in the above manner. The setting means holds the bead members by the time when the building drum D2 receives the carcass band. After the building drum D2 holds the carcass band, the setting means sets the bead members at the predetermined positions on both sides of the carcass band.

The stitcher 28 and the extruder E6 for extruding rubber strips constituting the bead fillers (bead pads) are mounted on a truck 73 moving on a movement section 72 extending in parallel with the movement section 22 of the building drum D2 along the movement section 22. The extruder E7 for extruding rubber strips constituting the side walls is provided on the truck 74.

In the second building stage S2, the carcass band is held by the building drum D2 and the bead members are set at the predetermined positions as described above. Then, the extruder E6 carried on the truck 73 is shifted to the positions corresponding to the bead members by the movement of the truck 73, and the rubber strips extruded from the extruder E6 are wound by the drum rotation so as to build the bead fillers. Thus, the rubber strips extruded from the E6 are wound on the bead members as additional bead fillers. After winding of the bead fillers, both the side ends of the carcass band are folded outward by the bladder of the turn-up means in such a manner as to cover the entire bead fillers. Then, the stitcher 28 is shifted to the corresponding positions by the movement of the truck 73, where the stitcher 28 stitches the turn-up portions.

Subsequently, the truck 73 is shifted from the position corresponding to the building drum D2 toward the side, and the truck 74 carrying the extruder E7 for building side walls is shifted to the position corresponding to the building drum D2. The rubber strips constituting the side walls extruded and supplied from the extruder E7 are wound and laminated on the predetermined positions of the carcass ply after turn-up by the drum rotation to build parts (approximately half) of the side walls.

The cylindrical green case assembled and built in the second building stage S2 as discussed above is shifted to the fourth building stage S4 in the following manner.

After the above formation, a case receiver stand 76 extending in the direction perpendicular to the movement section 22 advances toward below the second building drum D2, and rises to contact the green case. After the building drum D2 is contracted and separated, the case receiver stand 76 returns to the original position while carrying the green case. Then, a case hand 75 provided at the distal end of the transfer 27 of the case transfer means C2 lowers to the position of the green case carried on the case receiver stand 76, and a pair of hand claws of the case hand 75 shift toward the inside through the case opening. When reaching the case width, the hand claws stop moving and rise, thereby holding the beads provided at both the side ends of the opening of the green case by the hand claws from the inside of the green case and transferring the green case. The green case to be transferred are placed on temporary stands 77 and shifted to a case receiver stand 78 provided in the fourth building stage S4 by the case hand 75 of the transfer 27.

The fourth building stage S4 has the bead lock drum D4 as the fourth building drum for holding the beads of the green case and building the green case into the final shape. When the green case is shifted onto the case receiving stand 78, the bead lock drum D4 is moved and inserted into the green case carried on the case receiver stand 78. The beads are then held by the two drums d1 and d2 functioning as former rings. The drums d1 and d2 of the bead lock drum D4 are rotatably cantilevered by the support member 40 movable on the movement section 42 extending in the direction perpendicular to the case transfer means C2. The drums d1 and d2 apply internal pressure to the green case held by the bead lock drum D4 by charging the green case with compressed air.

The third building stage S3 as the step for building the belt and tread band has the movement section 32 continuing from the movement section 42 of the fourth building stage S4 for supporting the belt drums D3 (two drums in an ordinary case) as the third building drums by the support stand 30 such that the belt drums D3 can rotate, and for shifting the belt drums D3 to the building positions of the belt and tread rubber. Thus, a belt building servicer 80, the supply means 39 for supplying the spiral tapes containing fiber cords, the extruder E10 for extruding rubber strips constituting the tread base, and the extruder E11 for extruding rubber strips constituting the tread cap are disposed along the movement section 32.

The servicer 80 has a plurality of supply means for supplying the first and second belts and the like at a plurality of positions in upper and lower rows. When the belt drum D3 reaches the position corresponding to the servicer 80, the servicer 80 affixes and laminates plural belts such as the first and second belts while sequentially extruding the belts by the drum rotation. In this process, the operator affixes the belt starting portions, cuts the belt end portions, and connects the belt end portions and the starting portions. The belts used in this process are built by diagonally cutting a belt sheet having a predetermined width and a number of belt cords (metal cords) embedded in the rubber layer in parallel into pieces having predetermined length and angle. The diagonal end sides of the cut pieces are aligned, and sequentially butt joined. Then, belt edge tapes are affixed to both the side ends of the joined pieces and wound into a roll shape. The belts thus built are set on the supply section of the servicer 80 such that they can be extruded therefrom. The third building stage S3 also has an escape area 32a located on the side of the movement section 32, to which area 32a one of the building drums D3 escapes from the movement section 32 when the positions of the two building drums D3 are switched.

After the first belt and the second belt are affixed onto the belt drum D3, the belt drum D3 is shifted to the position corresponding to the spiral tape supply means 39, where the spiral tape supply means 39 spirally winds the spiral tape on the second belt. Then, the belt drum D3 shifting relative to the movement of the extruder E10 is rotated while the rubber strip for building the tread base is extruded for the belt drum D3. Thus, the rubber strip is wound on the spiral tape of the belt layer to build the tread base. Thereafter, the belt drum D3 is shifted to the position corresponding to the extruder E11 of the tread cap and the belt drum D3 shifting relative to the movement of the extruder E10 is similarly rotated while the rubber strip for building the tread cap is extruded so as to laminate and build the tread cap having predetermined thickness and width in accordance with the tread shape. As a result, the cylindrical belt and tread band is built.

The belt and tread band built as above is inserted into the annular transfer 60 as the third transfer means provided in such a manner as to be movable on the movement section 42 continuing from the movement section 32 by the relative movement of the transfer 60 and the belt drum D3. Then, the belt and tread band held from its outer circumference by the transfer 60 is separated from the belt drum D3 and shifted to the fourth stage S4.

In the fourth building stage S4, the belt and tread band held by the transfer 60 and the green case held by the bead lock drum D4 are combined, and the combined green case and the belt and tread band are held on the bead lock drum D4. The combining process is performed in a manner similar to those in the first through third embodiments.

Then, the combined green case and the belt and tread band are shifted to the building position of the side walls. At this position, operations of the drums d1 and d2 of the bead lock drum D4 as the former rings are executed, and internal pressure is applied. Then, the green case is built into the final shape, and the green case and the belt and tread band are assembled as one piece by the stitching of the stitcher 62.

Subsequently, rubber strips for building the side walls are extruded and supplied for both the sides of the assembled body from the extruders E12, E12 for extruding the rubber strips constituting the side walls. Then, parts (approximately half) of the side walls are affixed and laminated by the drum rotation, and the outer circumferential surface of the assembled body is pressed by the stitcher to complete the green tire.

The completed green tire is shifted to the extraction position while supported by the bead lock drum D4. After application of the internal pressure and the bead lock are released, the green tire is extracted from the fourth building stage S4 to the carrying stand 66 by the extracting unit 65.

Thus, similarly to the above cases, the tire building steps in the building method of the fourth embodiment are divided into the first through fourth building stages S1 through S4 having the building drums D1 through D4 corresponding to the respective building steps. Moreover, the winding step of the side walls is divided between the second building stage S2 and the fourth building stage S4, and the respective building processes in those building stages are simultaneously executed. Thus, the building cycle time different according to the types of rubber components can be distributed among the respective building stages. Particularly, when the rubber volume of the side wall is large, the winding step of the rubber strips can be divided between the two building stages. As a result, the building cycle time is not partially prolonged, and the time required for the building cycle becomes approximately equal in each building stage. Accordingly, the efficiency of the tire building processes can be increased.

INDUSTRIAL APPLICABILITY

The invention is applicable to formation of a tire having multiple laminated layers of tire components, particularly of an unvulcanized green tire.

Figure 1:
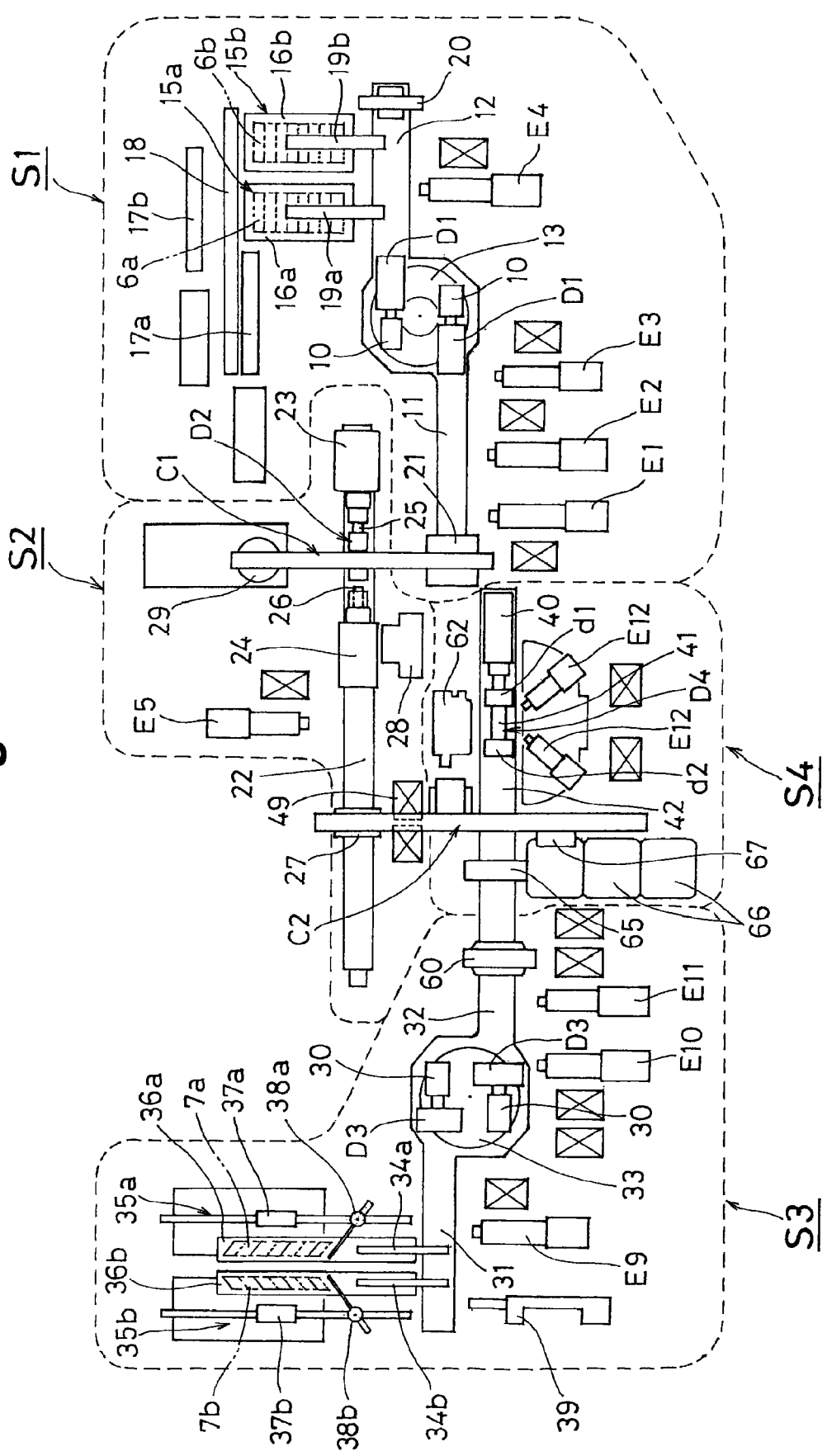
FIG. 1 schematically illustrates the entire structure of a building facility used in a first embodiment according to the invention.
Figure 2:
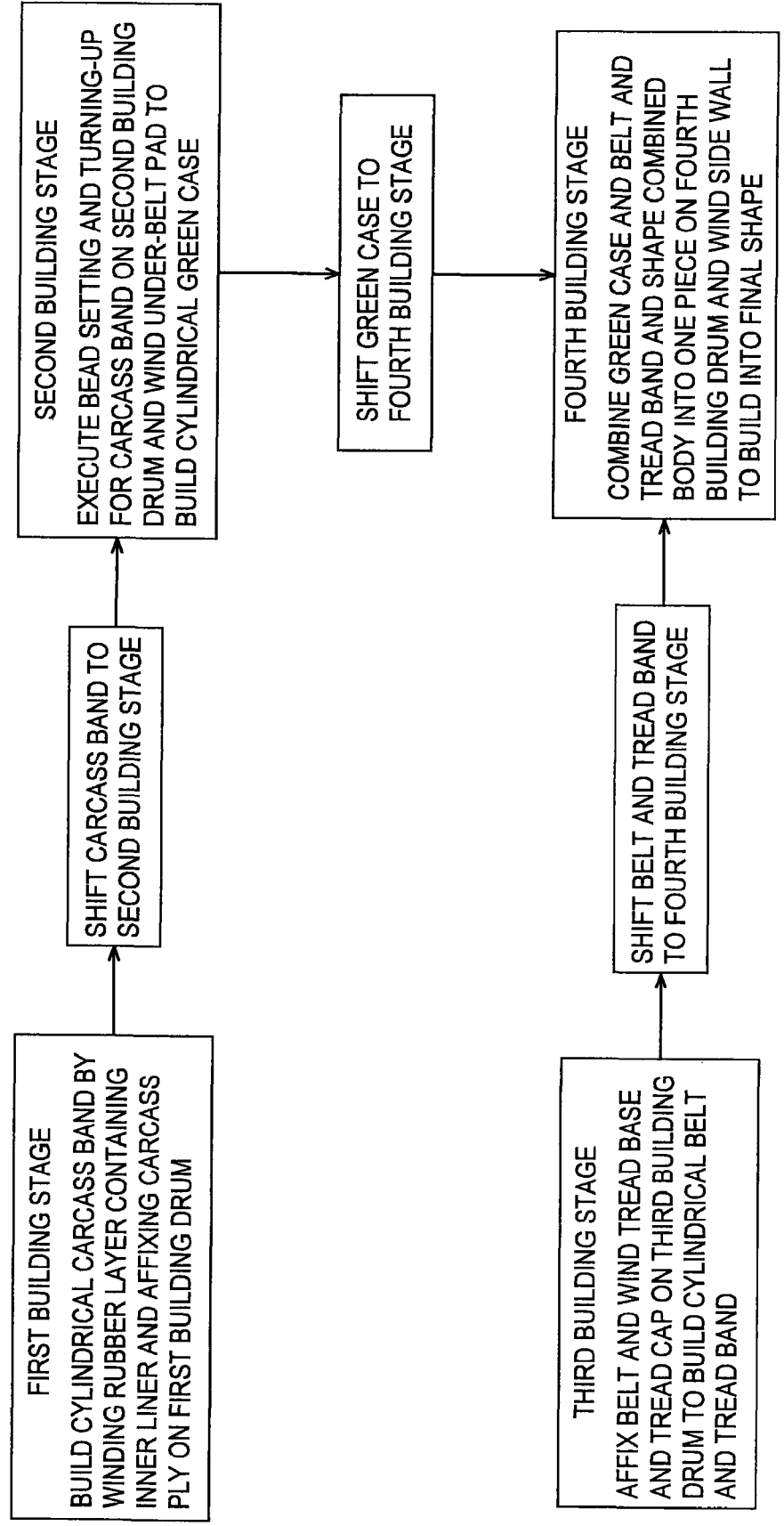
FIG. 2 is a block diagram showing building steps of a building method using the building facility shown in FIG. 1 in the first embodiment.
Figure 3:
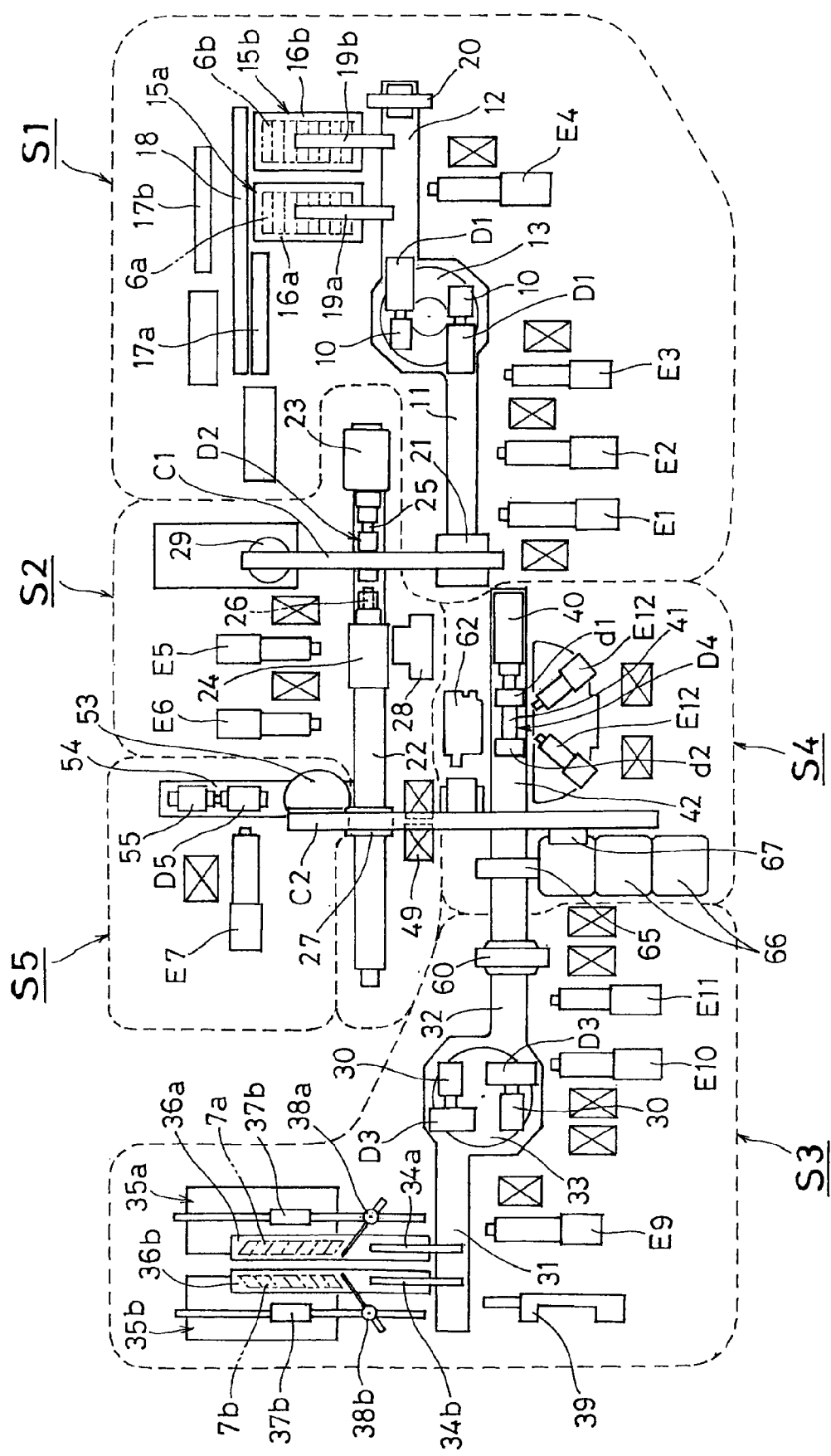
FIG. 3 schematically illustrates the entire structure of a building facility used in a second embodiment according to the invention.
Figure 4:
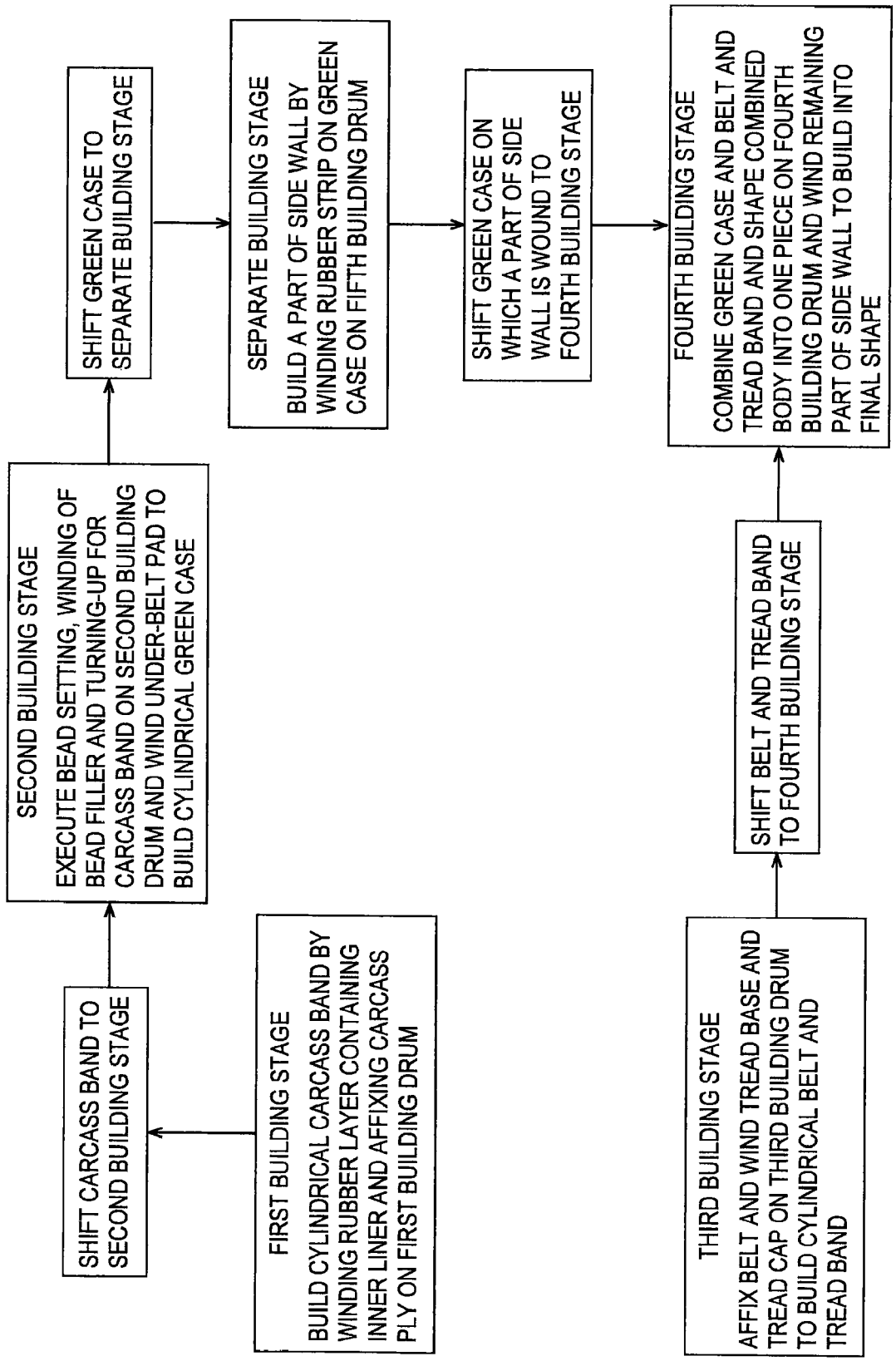
FIG. 4 is a block diagram showing building steps of a building method using the building facility shown in FIG. 3 in the second embodiment.
Figure 5:
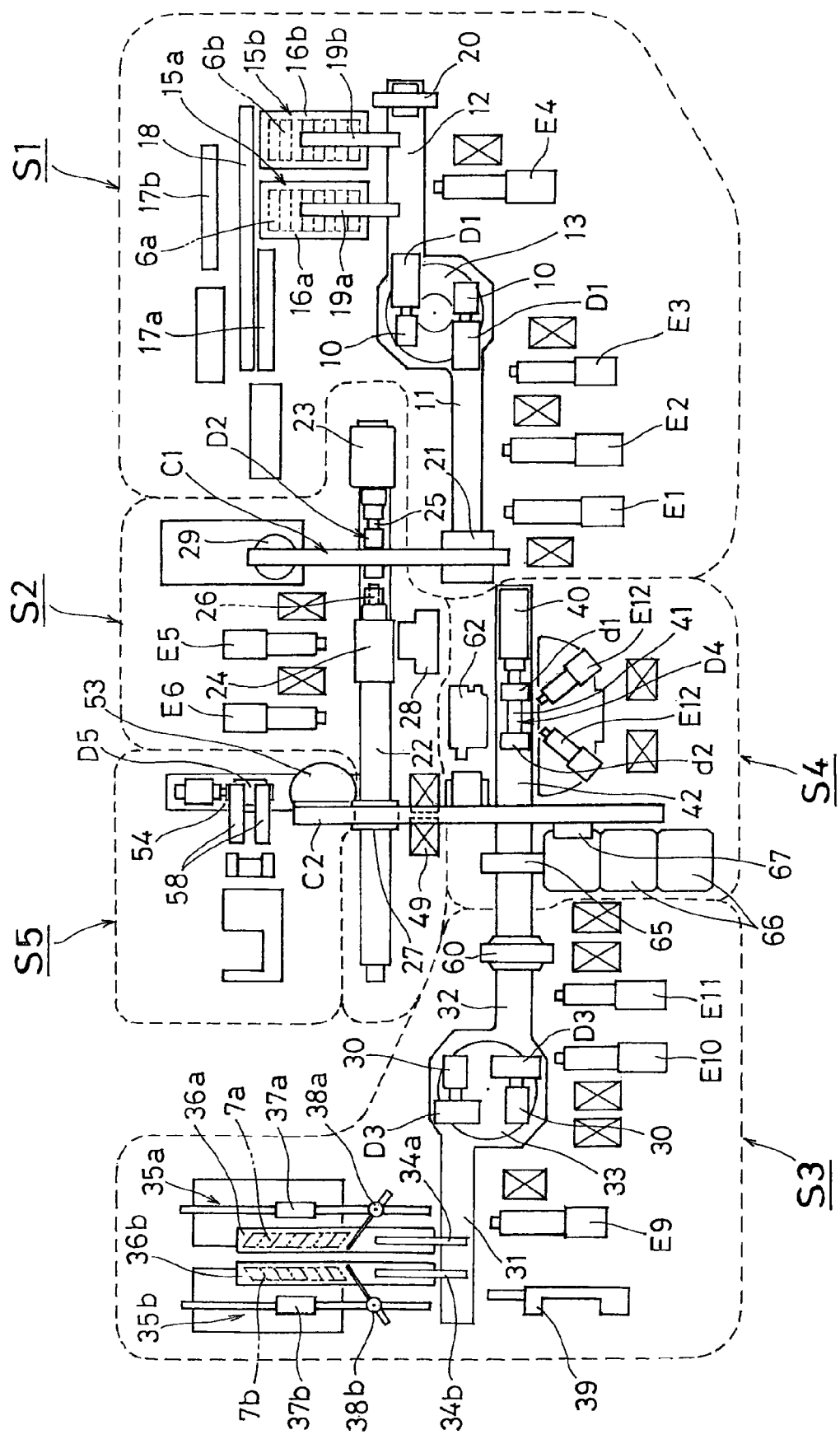
FIG. 5 schematically illustrates the entire structure of a building facility used in a third embodiment according to the invention.
Figure 6:
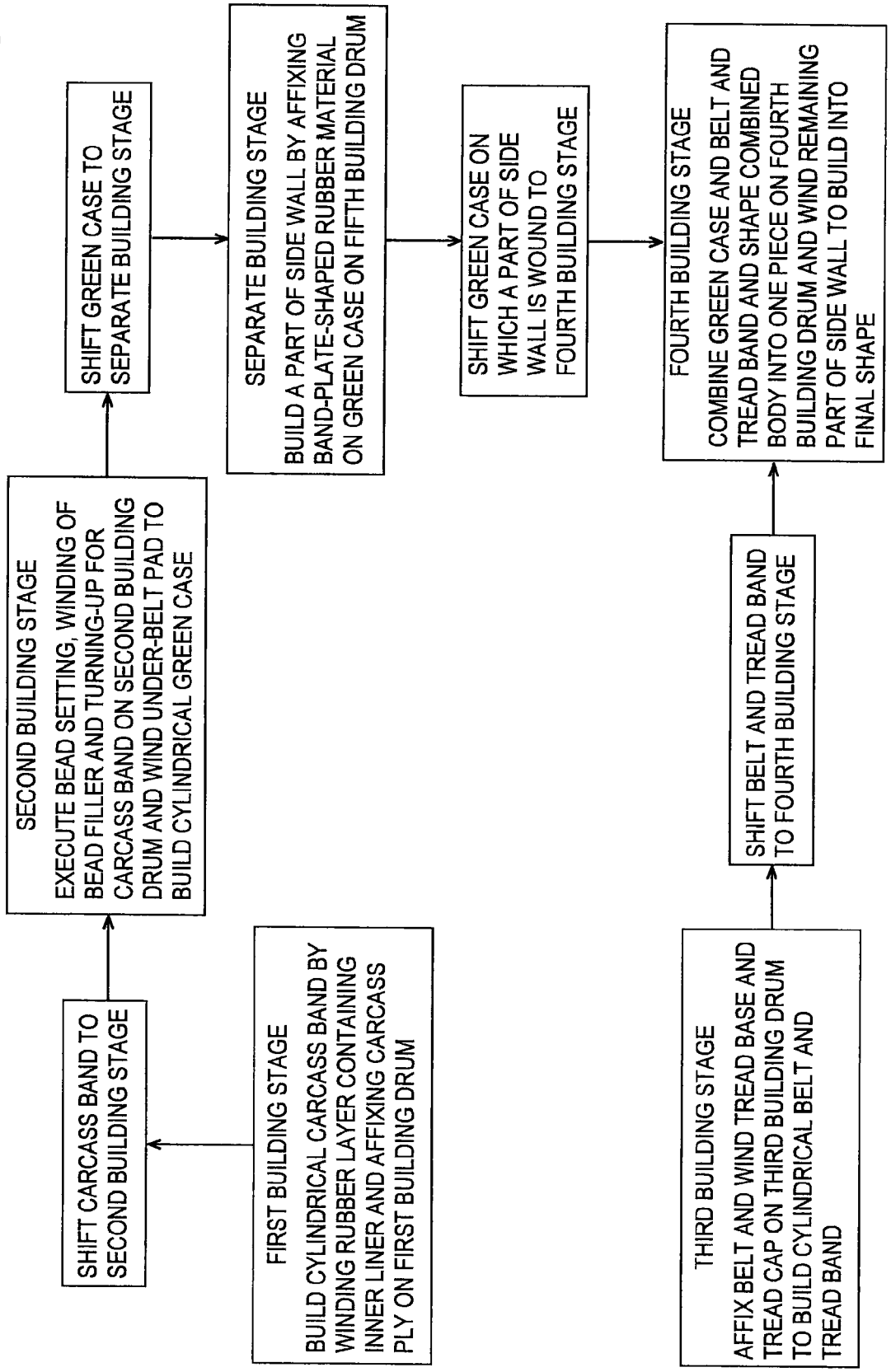
FIG. 6 is a block diagram showing building steps of a building method using the building facility shown in FIG. 5 in the third embodiment.
Figure 7:
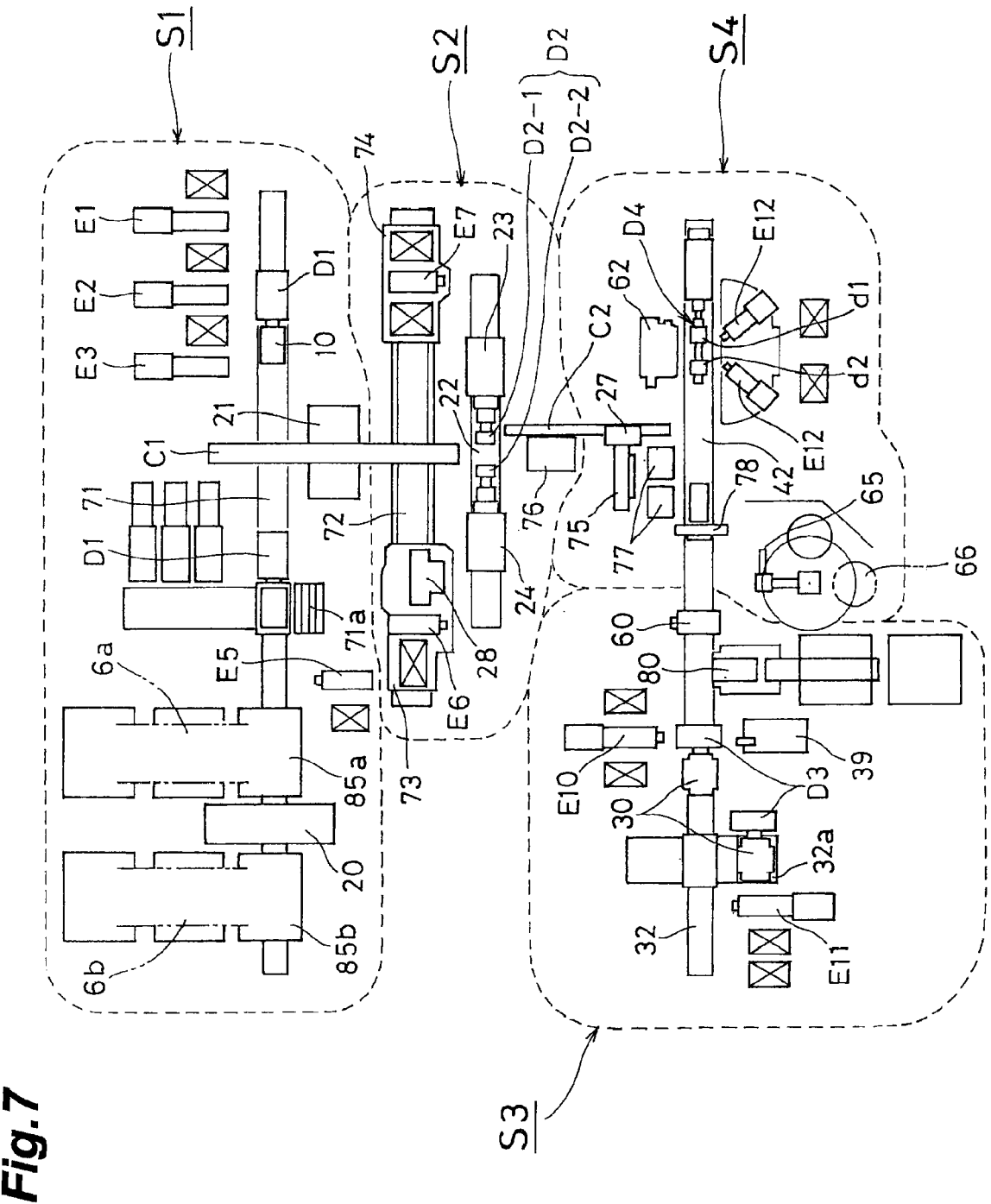
FIG. 7 schematically illustrates the entire structure of a building facility used in a fourth embodiment according to the invention.
Figure 8:
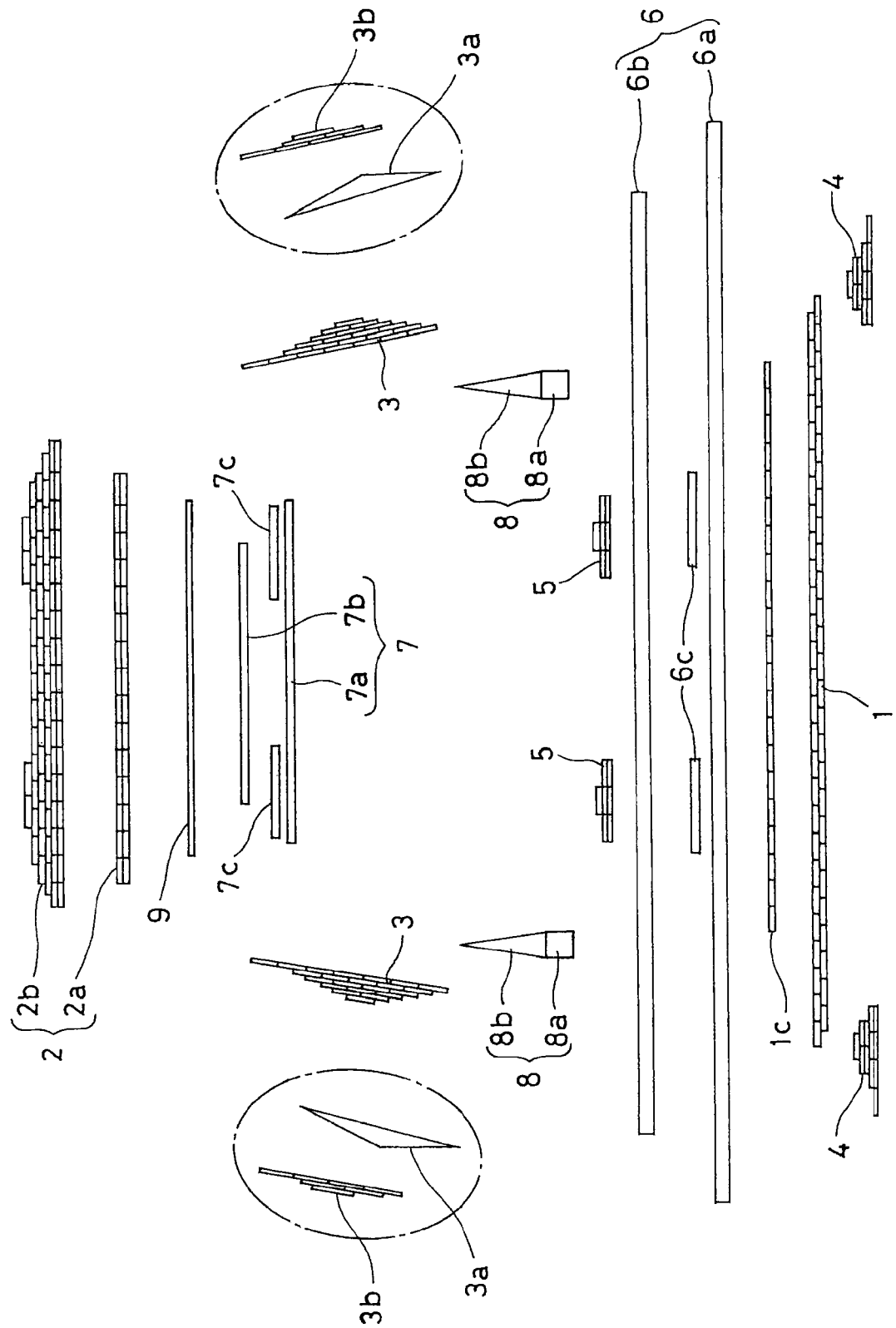
FIG. 8 is a cross-sectional view schematically illustrating an example of disassembled tire components.
Figure 9:
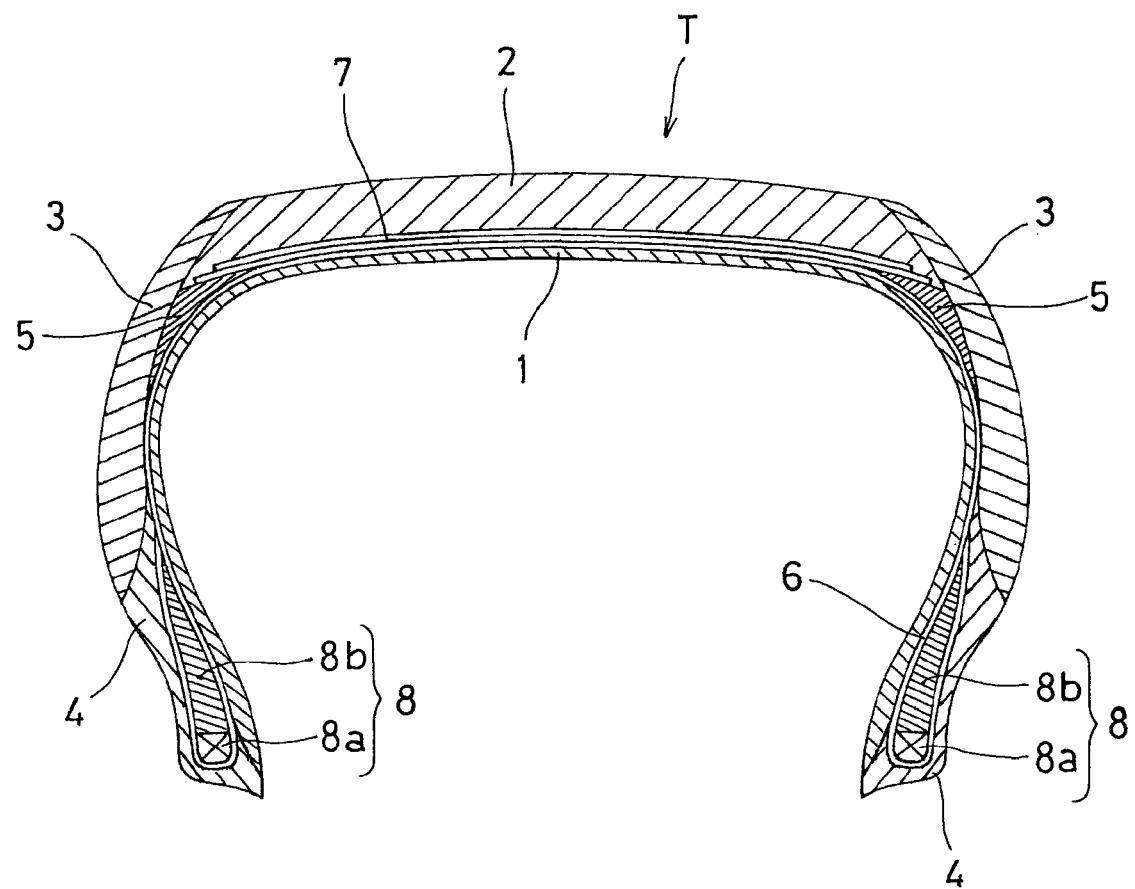
FIG. 9 is a cross-sectional view of a tire.

T tire
1 inner liner
2 tread
3 side wall
4 chafer
5 under-belt pad
6 carcass layer
7 belt layer
S1 first building stage
S2 second building stage
S3 third building stage
S4 fourth building stage
S5 separate building stage
D1 first building drum
D2 second building drum
D3 belt drum as third building drum
D4 bead lock drum as fourth building drum
D5 fifth building drum
E1, E2, E3, E4, E5, E6, E7, E8, E9, E10, E11, E12 extruder
C1 band transfer means
C2 case transfer means
15a, 15b first and second carcass ply servicers
35a, 35b first and second belt building units
60 transfer

The invention claimed is:

1. A tire building method for obtaining an unvulcanized green tire by laminating a carcass ply on a rubber layer containing an inner liner to build a cylindrical carcass band, setting a bead on the carcass band and turning up the carcass band to build a cylindrical green case, and assembling and combining a cylindrical belt and tread band on which a belt, a tread and the like are laminated on the outer circumference of the green case to build a final shape, characterized in that:

(1) a step for building the cylindrical carcass band,
a subsequent step for building the cylindrical green case,
a step for building the cylindrical belt and tread band, and
a step for combining the green case and the belt and tread band to build the final shape
are divided as first through fourth building stages S1 to S4 having individual building drums D1 to D4 corresponding to the respective steps;

(2) with a fourth building stage S4 for building the final shape arranged at a center, a first building stage S1 for building the carcass band is arranged in an area adjacent to the fourth building stage S4 on one side in the direction of an axial center of a drum D4, a third building stage S3 for building the belt and tread band is arranged in an area adjacent to the fourth building stage S4 on the other side in the direction of the axial center of the drum D4, and a second building stage S2 for building the green case is arranged in an area adjacent to the fourth building stage S4 on a rear side thereof and also adjacent to the first building stage S1 so that the respective axial centers of the drums D1 to D4 are disposed in parallel with each other;

(3) formations in the respective stages S1 to S4 are simultaneously performed by shifting
the carcass band built in the first building stage S1 to the second building stage S2 by first shifting means which transport the carcass band in the direction orthogonal to the axial center of the drum D1,
the green case built in the second building stage S2 directly to the fourth building stage S4 by second shifting means which transport the green case in the direction orthogonal to the axial center of the drum D2, and
the belt and tread band built in the third building stage S3 to the fourth building stage S4 to combine the belt and tread band with the green case;

(4) the first building stage S1 includes two drums and first and second movement sections, and the drums are alternately moved between the first movement section and the second movement section to simultaneously build a rubber layer containing an inner liner and a carcass band by moving the drums to building positions of the rubber layer containing an inner liner in the first movement section, by moving the drums to a building positions of the carcass ply in the second movement section, and by rotating the drums by 180° through a rotational movement section provided between the first movement section and the second movement section; and (5) rubber components
are built by winding band-shaped rubber strips extruded from extruders E1, E2, E3, E4, E10 and E11.

2. The tire building method according to claim 1, characterized in that, the third building stage S3 includes two drums and first and second movement sections and the drums are alternately moved between the first movement section and the second movement section to simultaneously affix a belt and build a tread, by moving the drums to building positions for affixing the belt in the first movement section, by moving the drums to building positions of the tread in the second movement section, and by rotating the drums by 180° through a rotational movement section provided between the first movement section and the second movement section.

3. The tire building method according to claim 1 or 2, wherein
an extruder E5 that extrudes a rubber strip building under-belt pads laminated under both side ends of a belt layer wound on the carcass outer circumference of the green case is provided at a predetermined building position in the second building stage S2, and under-belt pads laminated under both side ends of the belt layer are built by winding a rubber strip extruded from the extruder E5 on the carcass outer circumference of the green case in the second building stage S2.

4. The tire building method according to claim 3, characterized in that at least a part of a side wall is built by winding a rubber strip extruded from an extruder E12 in the fourth building stage.

5. The tire building method according to claim 4, wherein:
a separate building stage S5 for affixing the side wall, in which stage the green case is supported by another building drum D5, is provided in an area following the second building stage;
an extruder E7 that extrudes a rubber strip building a part of the side wall is equipped in the separate building stage S5;
and
a part of the side wall is built by winding the rubber strip extruded from the extruder E7 with the green case supported by the building drum D5.

6. The tire building method according to claim 4, wherein:
a separate building stage S5 for affixing the side wall, in which stage S5 the green case is supported by another building drum D5, is provided in an area following the second building stage S2; and
a part of the side wall is built by affixing band-plate-shaped rubber material with the green case supported by the building drum D5.

7. The tire building method according to claim 1 or 2, characterized in that at least a part of a side wall is built by winding a rubber strip extruded from an extruder E12 in the fourth building stage.

8. A tire building facility for obtaining an unvulcanized green tire by laminating a carcass ply on a rubber layer containing an inner liner to build a cylindrical carcass band, setting a bead on the carcass band and turning up the carcass band to build a cylindrical green case, and assembling and combining a cylindrical belt and tread band on which a belt, a tread and the like are laminated on the outer circumference of the green case to build a final shape, characterized in that:

(1) a step S1 for building the cylindrical carcass band, a subsequent step S2 for building the cylindrical green case, a step S3 for building the cylindrical belt and tread band, and a step S4 for combining the green case and the belt and tread band to build the final shape are divided as first through fourth building stages having individual building drums D1 to D4 corresponding to buildings of the respective steps;

(2) with a fourth building stage S4 for building the final shape arranged at a center, a first building stage S1 for building the carcass band is arranged in an area adjacent to the fourth building stage S4 on one side in the direction of an axial center of a drum D4, a third building stage S3 for building the belt and tread band is arranged in an area adjacent to the fourth building stage S4 on the other side in the direction of the axial center of the drum D4, and a second building stage S2 for building the green case is arranged in an area adjacent to the fourth building stage S4 on a rear side thereof and also adjacent to the first building stage S1 so that the respective axial centers of the drums D1 to D4 are disposed in parallel with each other;

(3) the tire building facility includes first shifting means that is extended in the direction orthogonal to the axial center of the drum D1 and shifts the carcass band built in the first building stage S1 to the second building stage S2 in the direction orthogonal to the axial center of the drum D1, second shifting means that is extended in the direction orthogonal to the axial center of the drum D2 and shifts the green case built in the second building stage S2 directly to the fourth building stage S4 in the direction orthogonal to the axial center of the drum D2, and third shifting means that shifts the belt and tread band built in the third building stage S3 to the fourth building stage S4 to simultaneously perform building in the respective stages;

(4) the first building stage S1 includes two drums, a first movement section for moving the drums to building positions of the rubber layer containing an inner liner, and a second movement section for moving the drums to building positions of the carcass ply, in which a rotational movement section for rotating the drums by 180° is provided between the first movement section and the second movement section and the rubber layer containing an inner liner and the carcass band are simultaneously built by alternately moving the drums between the first movement section and the second movement section;

(5) a building drum D1 in the first building stage S1, a building drum D2 in the second building stage S2, a building drum D3 in the third building stage S3, and a building drum D4 in the fourth building stage S4 are disposed in such conditions as to be movable in axial directions in the respective building stages with axial centers of the respective drums extending in parallel; and (6) extruders E1, E2, E3, E4, E10 and E11 that extrude band-shaped rubber strips building rubber components such as a rubber layer containing an inner liner included in the carcass band, and
a rubber layer between belt layers and
a tread rubber included in the belt and
tread band
are disposed at building positions determined for each of the rubber components in the first and third building stages S1 and S3.

9. The tire building facility according to claim 8, characterized in that, the third building stage S3 includes two drums, a first movement section for moving the drums to building positions for affixing a belt, and a second movement section for moving the drums to building positions of a tread, in which a rotational movement section for rotating the drums by 180° is provided between the first movement section and the second movement section and affixing the belt and building the tread are simultaneously performed by alternately moving the drums between the first movement section and the second movement section.

10. The tire building facility according to claim 8 or 9, wherein an extruder E5 that extrudes a rubber strip building under-belt pads laminated under both side ends of a belt layer wound on the carcass outer circumference of the green case is provided at a predetermined building position in the second building stage S2.

11. The tire building facility according to claim 10, characterized in that an extruder E12 that extrudes the rubber strip building at least a part of a side wall is provided at a predetermined building position in the fourth building stage S4.

12. The tire building facility according to claim 11, wherein:

a separate building stage S5 for affixing the side wall, in which stage the green case is supported by another building drum D5, is provided in an area following the second building stage S2; and an extruder E7 that extrudes a rubber strip building a part of the side wall is equipped in the separate building stage S5.

13. The tire building facility according to claim 11, wherein:

a separate building stage S5 for affixing the side wall, in which stage the green case is supported by another building drum D5, is provided in an area following the second building stage S2; and a servicer that supplies and affixes band-plate-shaped rubber material building a part of the side wall is equipped in the separate building stage S5.

14. The tire building facility according to claim 8 or 9, characterized in that an extruder E12 that extrudes the rubber strip building at least a part of a side wall is provided at a predetermined building position in the fourth building stage S4.

* * * * *